(12) United States Patent
Sorakado

(10) Patent No.: US 8,290,957 B2
(45) Date of Patent: Oct. 16, 2012

(54) INFORMATION PROCESSING APPARATUS, INFORMATION PROCESSING METHOD AND PROGRAM THEREFOR

(75) Inventor: Hideki Sorakado, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 12/766,575

(22) Filed: Apr. 23, 2010

(65) Prior Publication Data

US 2010/0312765 A1    Dec. 9, 2010

(30) Foreign Application Priority Data

Jun. 4, 2009    (JP) .................................. 2009-135356

(51) Int. Cl.
*G06F 17/30*    (2006.01)

(52) U.S. Cl. ........................................ 707/737; 707/754

(58) Field of Classification Search .................. 707/737, 707/754
See application file for complete search history.

(56) References Cited

U.S. PATENT DOCUMENTS

| | | | | |
|---|---|---|---|---|
| 7,149,755 B2 * | 12/2006 | Obrador | ................................ | 1/1 |
| 7,281,664 B1 * | 10/2007 | Thaeler et al. | ............ | 235/462.49 |
| 7,313,574 B2 * | 12/2007 | Paalasmaa et al. | .................... | 1/1 |
| 7,653,635 B1 * | 1/2010 | Paek et al. | ................... | 707/999.1 |
| 7,698,336 B2 * | 4/2010 | Nath | .............................. | 707/737 |
| 8,086,048 B2 * | 12/2011 | Naaman et al. | .................. | 382/225 |
| 2002/0101418 A1 * | 8/2002 | Vernier et al. | ................ | 345/418 |
| 2002/0188602 A1 * | 12/2002 | Stubler et al. | ...................... | 707/3 |
| 2003/0074369 A1 * | 4/2003 | Schuetze et al. | .......... | 707/103 R |
| 2003/0083964 A1 * | 5/2003 | Horwitz et al. | ................. | 705/28 |
| 2004/0049734 A1 * | 3/2004 | Simske | ......................... | 715/512 |
| 2005/0104976 A1 * | 5/2005 | Currans | ...................... | 348/231.5 |
| 2006/0107297 A1 * | 5/2006 | Toyama et al. | ................ | 725/105 |
| 2007/0115373 A1 * | 5/2007 | Gallagher et al. | .......... | 348/231.3 |
| 2007/0198746 A1 * | 8/2007 | Myllyla et al. | ................. | 709/248 |
| 2008/0069449 A1 * | 3/2008 | Cho et al. | ....................... | 382/195 |
| 2008/0201302 A1 * | 8/2008 | Kimchi et al. | ..................... | 707/3 |
| 2008/0298766 A1 * | 12/2008 | Wen et al. | ......................... | 386/46 |
| 2009/0125560 A1 * | 5/2009 | Munekuni et al. | .......... | 707/104.1 |
| 2009/0161962 A1 * | 6/2009 | Gallagher et al. | ............. | 382/203 |
| 2009/0279794 A1 * | 11/2009 | Brucher et al. | ............... | 382/225 |
| 2009/0290812 A1 * | 11/2009 | Naaman et al. | ............... | 382/305 |
| 2009/0304272 A1 * | 12/2009 | Makadia et al. | ............... | 382/165 |
| 2010/0029326 A1 * | 2/2010 | Bergstrom et al. | ......... | 455/556.1 |
| 2010/0080470 A1 * | 4/2010 | Deluca et al. | ................. | 382/209 |
| 2010/0171763 A1 * | 7/2010 | Bhatt et al. | ..................... | 345/660 |
| 2010/0250136 A1 * | 9/2010 | Chen | .............................. | 701/300 |
| 2011/0013810 A1 * | 1/2011 | Engstrom et al. | ............. | 382/118 |
| 2011/0066588 A1 * | 3/2011 | Xie et al. | ......................... | 706/58 |

FOREIGN PATENT DOCUMENTS

JP    2005-149511    6/2005

\* cited by examiner

*Primary Examiner* — Phuong Thao Cao

(74) *Attorney, Agent, or Firm* — Fitzpatrick, Cella, Harper & Scinto

(57) ABSTRACT

Information processing in which a position metadata piece is acquired from a target data piece, the position metadata piece indicating a position. Position metadata pieces are acquired from a plurality of other data pieces different from the target data piece. Target metadata pieces other than the position metadata pieces from the other data pieces are acquired, a distribution of the target metadata pieces is analyzed based on positions indicated by the position metadata pieces acquired from the other data pieces, and a target metadata piece that has a value related to the target data piece is assigned to the target data piece, the target metadata piece being selected from among the analyzed target metadata pieces, based on the distribution and the position indicated by the position metadata piece acquired from the target data piece.

7 Claims, 12 Drawing Sheets

| HIGHEST-LEVEL FLAG | PARENT METADATA | CHILD METADATA |
|---|---|---|
| ON | JAPAN | TOKYO |
| ON | JAPAN | KYOTO |
| OFF | TOKYO | TOKYO TOWER |
| OFF | KYOTO | TEMPLE OF GOLDEN PAVILION |
| OFF | KYOTO | NIJO CASTLE |
| ON | U.S. | NEW YORK |
| OFF | NEW YORK | STATUE OF LIBERTY |

| ESTIMATION TARGET METADATA | ESSENTIAL FEATURE METADATA |
|---|---|
| PLACE NAME | SHOOTING POSITION |
| EVENT NAME | SHOOTING DATE AND TIME, SHOOTING POSITION |
| WEATHER | SHOOTING DATE AND TIME, SHOOTING POSITION |
| SEASON | SHOOTING DATE AND TIME |

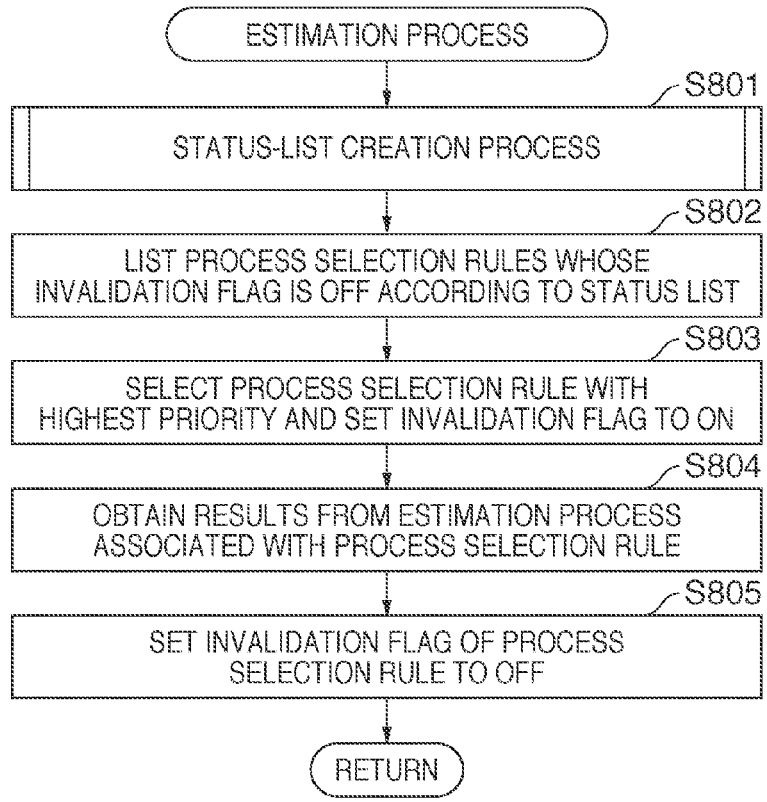

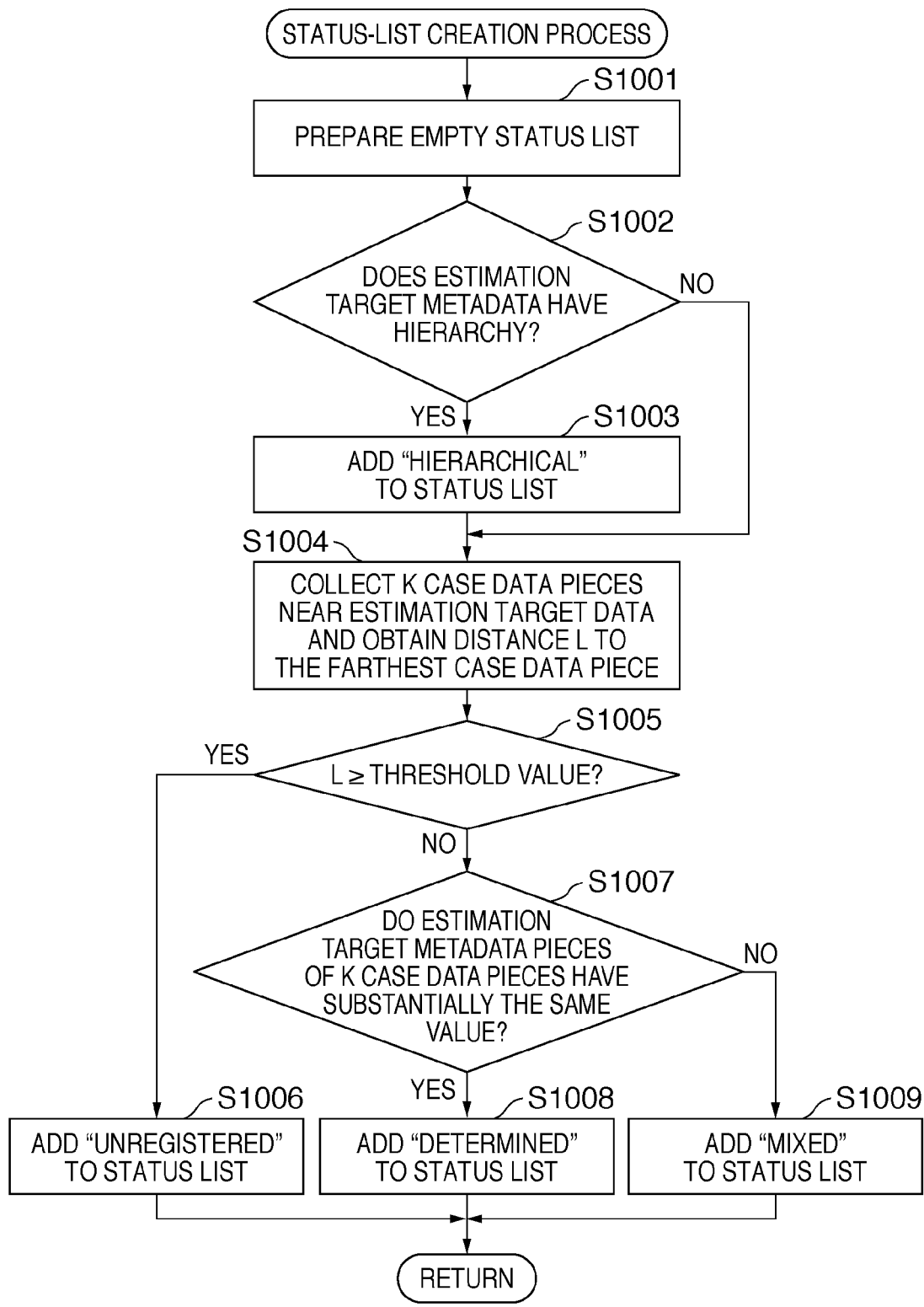

| ESTIMATION TARGET METADATA | ESSENTIAL FEATURE METADATA | ADDITIONAL FEATURE METADATA |
|---|---|---|
| PLACE NAME | SHOOTING POSITION | SHOOTING DATE AND TIME, PHOTOGRAPHER INFORMATION |
| EVENT NAME | SHOOTING DATE AND TIME, SHOOTING POSITION | PHOTOGRAPHER INFORMATION |

| CLUSTER ID | METADATA VALUE |
|---|---|
| 1701 | A |
| 1702 | B |
| 1703 | C |
| 1704 | D |
| 1705 | B |

| HIGHEST-LEVEL FLAG | PARENT CLUSTER ID | CHILD CLUSTER ID |
|---|---|---|
| ON | 1701 | 1702 |
| OFF | 1702 | 1703 |
| ON | 1704 | 1705 |

INFORMATION PROCESSING APPARATUS, INFORMATION PROCESSING METHOD AND PROGRAM THEREFOR

BACKGROUND OF THE INVENTION

1. Field of the Invention

The present invention relates to an information processing apparatus, an information processing method, and program therefor, and in particular relates to a technique to assign metadata to target data.

2. Description of the Related Art

The proliferation of digital cameras and digital video recorders has dramatically increased the number of still images and moving images managed by users. To manage such a large amount of image data, information that explains images, such as names of events and shooting places at the time of shooting, is used, which is known as metadata. For example, a user inputs an event name or the like of image data to be found, and the desired image data is looked for based on the event name or the like.

Conventionally, in order to assign such metadata, a configuration is known in which information related to images is estimated using information obtained from external resources (Japanese Patent Laid-Open No. 2005-149511). In this configuration, information available from external resources is identified using metadata that represents the status at the time of shooting, such as shooting dates and times or shooting positions. In cases where external resources provide systematically managed information such as National Weather Service, metadata will be determined with high precision.

However, in cases where image data pieces to which the names of shooting places, for example, have been previously assigned are collected and used as external resources, metadata is not always determined with high precision. For example, data such as the names of shooting places may have a hierarchy. Thus, different metadata values may be assigned to the same shooting place. In addition, indiscriminate use of a common metadata estimation method, irrespective of the distribution of case data pieces relative to an estimation target data piece, does not always determine optimum metadata with high precision. Therefore, it is insufficient to only identify those data pieces that have similar metadata that represents the status at the time of shooting.

SUMMARY OF THE INVENTION

The present invention aims to provide a technique that allows high-precision determination of appropriate metadata, irrespective of the properties of data prepared in advance for the estimation of metadata.

According to one aspect of the present invention, there is provided an information processing apparatus including: a first position acquiring unit adapted to acquire a position metadata piece from a target data piece, the position metadata piece indicating a position; a second position acquiring unit adapted to acquire position metadata pieces from a plurality of other data pieces different from the target data piece; a target acquiring unit adapted to acquire target metadata pieces other than the position metadata pieces from the other data pieces; an analysis unit adapted to analyze a distribution of the target metadata pieces based on positions indicated by the position metadata pieces acquired from the other data pieces; and an assignment unit adapted to assign to the target data piece a target metadata piece that has a value related to the target data piece, the target metadata piece being selected from among the analyzed target metadata pieces, based on the distribution and the position indicated by the position metadata piece acquired from the target data piece.

According to another aspect of the present invention, there is provided an information processing method including: a first position acquiring step of acquiring a position metadata piece from a target data piece, the position metadata piece indicating a position; a second position acquiring step of acquiring position metadata pieces from a plurality of other data pieces different from the target data piece; a target acquiring step of acquiring target metadata pieces other than the position metadata pieces from the other data pieces; an analyzing step of analyzing a distribution of the target metadata pieces based on positions indicated by the position metadata pieces acquired from the other data pieces; and an assigning step of assigning to the target data piece a target metadata piece that has a value related to the target data piece, the target metadata piece being selected from among the analyzed target metadata pieces, based on the distribution and the position indicated by the position metadata piece acquired from the target data piece.

Further features of the present invention will become apparent from the following description of exemplary embodiments (with reference to the attached drawings).

BRIEF DESCRIPTION OF THE DRAWINGS

FIG. 8 is a flow chart showing an example procedure in an estimation process.

FIG. 9 illustrates an example of a process selection table.

FIG. 10 is a flow chart showing an example procedure in a status analysis process.

DESCRIPTION OF THE EMBODIMENTS

Hereinafter, exemplary embodiments of the present invention will be described in detail with reference to the accompanying drawings.

Hardware Configuration

A hardware configuration of a computer device that constitutes a server device or a client device according to the present embodiment will be described with reference to the block diagram in FIG. 1. A server device or a client device each may be implemented by a single computer device or may be implemented by multiple computer devices having distributed functions as necessary. In cases where a device is configured by multiple computer devices, those devices are connected to a network such as a Local Area Network (LAN) so as to establish communications with one another. Each computer device may be implemented by an information processing apparatus such as a personal computer (PC) or a workstation (WS).

Figure 1:
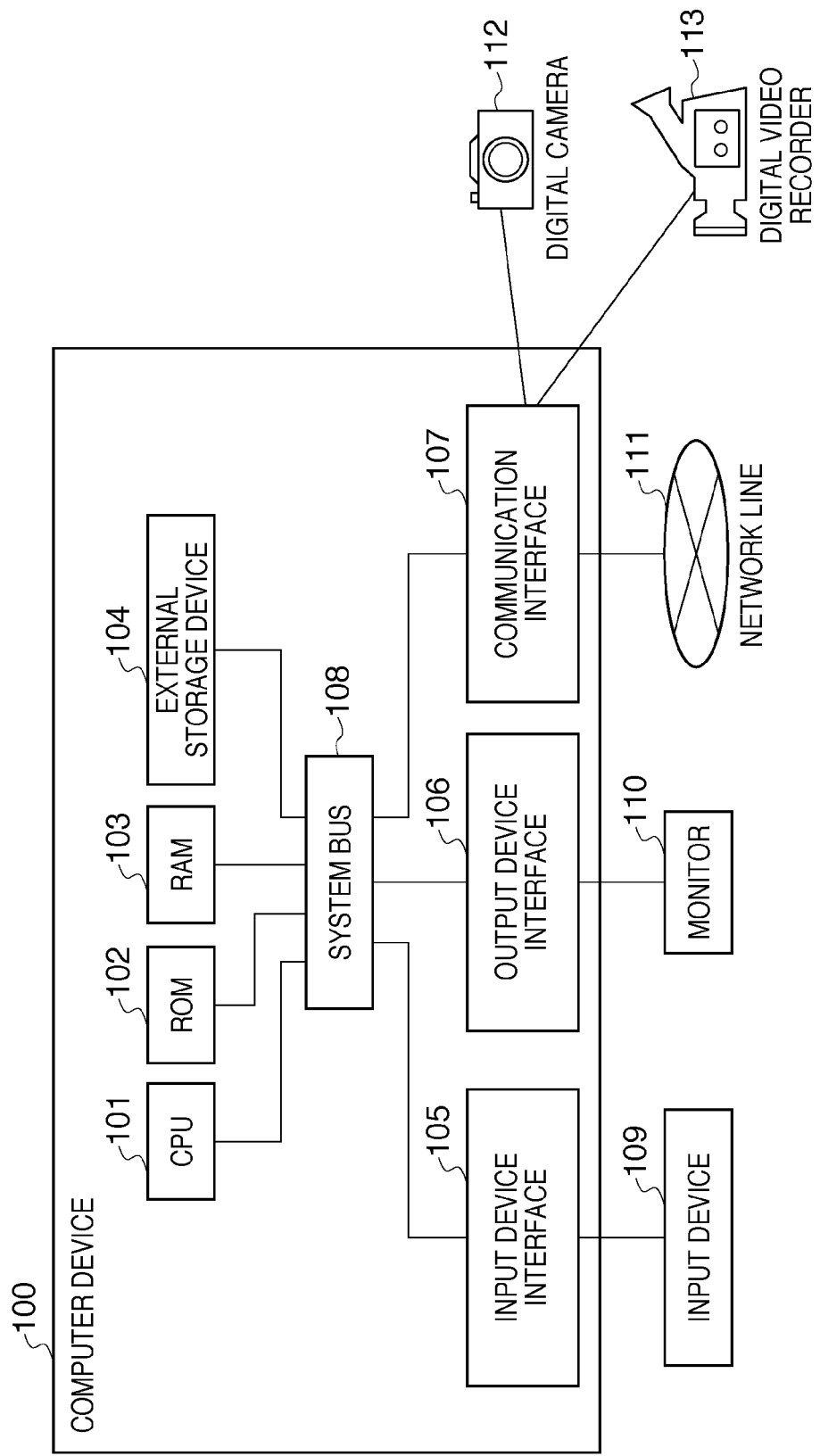
FIG. 1 illustrates an example hardware configuration of a computer device.

In FIG. 1, reference numeral 101 denotes a central processing unit (CPU) that controls the whole computer device 100. Reference numeral 102 denotes a read only memory (ROM) that stores programs and parameters that do not require any change. Reference numeral 103 denotes a random access memory (RAM) that temporarily stores programs and data supplied from external devices, for example.

Reference numeral 104 denotes an external storage device for storing data. Examples of the storage device include a hard disk installed fixed to the computer device 100, and a memory card. Other examples of the external storage device 104 include optical discs such as flexible disks (FDs) and compact disks (CDs) that are detachable from the computer device 100, and storage media such as magnetic or optical cards, IC cards, and memory cards.

Reference numeral 105 denotes an interface with an input device 109 such as a pointing device or a keyboard that input data with user operations. Reference numeral 106 denotes an interface with a monitor 110 for displaying data held in the computer device 100 or supplied data. Reference numeral 107 denotes a communication interface for providing connection to a network line 111 such as the Internet or to imaging equipment such as a digital camera 112 or a digital video recorder 113. Reference numeral 108 denotes a system bus that connects the units 101 to 107 so as to enable communication. Operations to be described later are implemented by the CPU 101 executing programs stored in computer-readable storage media such as the ROM 102.

Configuration of Image Data

Figure 2:
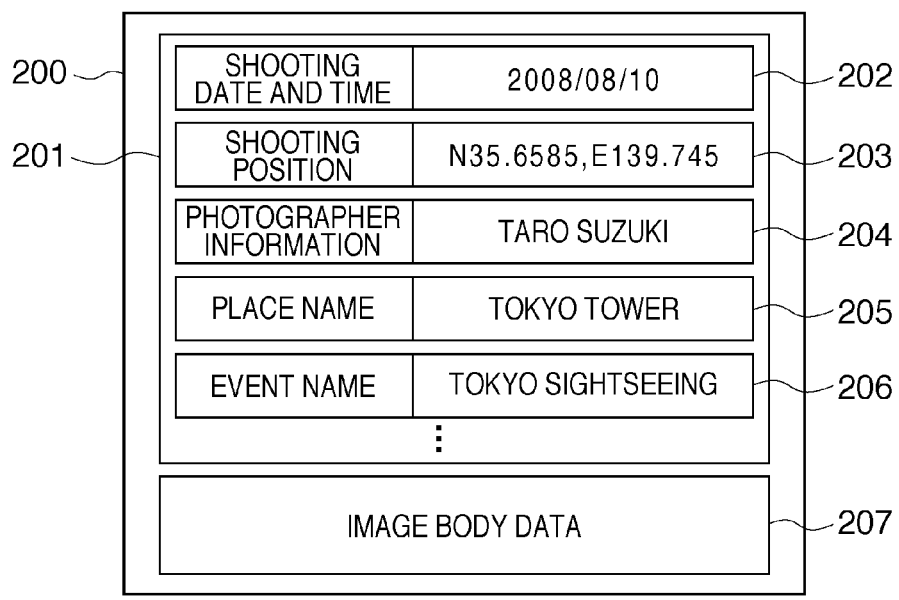
FIG. 2 illustrates an example configuration of image data.

The configuration of image data according to the present embodiment will be described with reference to FIG. 2. In FIG. 2, image data 200 is either a still image generated by a digital camera or a moving image generated by a digital video recorder. The image data 200 includes metadata 201 and image body data 207.

The metadata 201 is data that explains the image data 200. In the present embodiment, the metadata 201 is configured by a shooting date and time 202, a shooting position 203, photographer information 204, a place name 205, and an event name 206, each metadata piece having a metadata name and a value.

The shooting date and time 202 indicates the date and time when the image was captured by a digital camera or the shooting start date and time with a digital video recorder, and it may be assigned by imaging equipment. The shooting position 203 indicates shooting position information assigned by a global positioning system (GPS), for example. The photographer information 204 is information about the person who performed the shooting, such as the name of the owner of the imaging equipment, which may be assigned according to the settings of the imaging equipment.

The place name 205 and the event name 206 indicate the names of the place and the event at the time of shooting, respectively. They may be assigned by users or with use of a metadata assigning device according to the present embodiment. Note that all of those metadata pieces may not always be assigned, and for example, there may be cases where only the shooting date and time 202 and the shooting position 203 are assigned.

Note that the metadata 201 is described in an Exif, XML, or XMP (extensible metadata platform) format, for example. In FIG. 2, while the place name 205 and the event name 206 each have a single assigned value, multiple values may be assigned thereto. Alternatively, hierarchical values may be assigned thereto. For example, values such as "Tokyo⇒Tokyo Tower" may be assigned. Here, the symbol "⇒" represents a hierarchical relation.

The image body data 207 is the body of the image data 200 that is pixel data of a still image or a moving image. Note that, instead of being embedded in the image data 200, the metadata 201 may be stored separately in association with the image body data 207.

Configuration of Metadata Assigning Device

Figure 3:
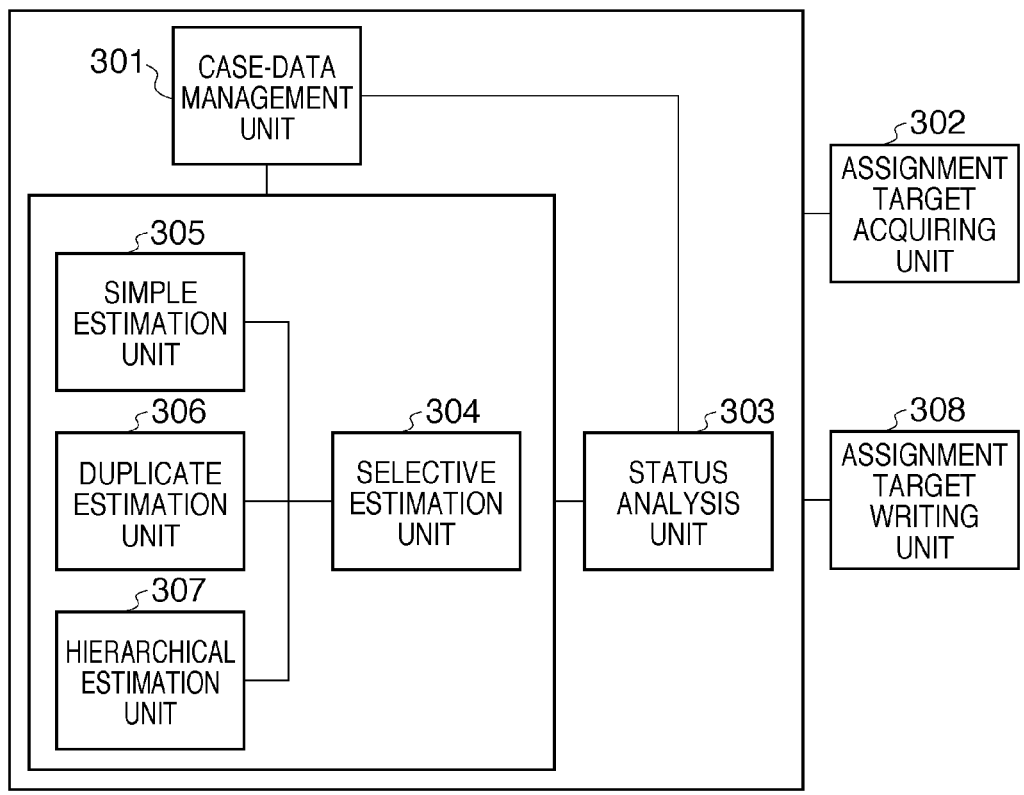
FIG. 3 illustrates example modules that constitute a metadata assigning device.

A configuration of the metadata assigning device according to the present embodiment will be described with reference to FIG. 3. FIG. 3 is a block diagram exemplifying a functional configuration of the metadata assigning device. A case management unit 301 manages image data to which metadata has been previously assigned. Alternatively, it may manage only the metadata 201 without holding the image body data 207. As another alternative, information equivalent to metadata information may be managed. For example, place names at points with the latitudes and longitudes registered by users may be managed. Hereinafter, multiple kinds of metadata pieces managed by the case management unit 301 are referred to as "case data pieces." The case data pieces, as described later, are used to determine metadata values that are assigned to targets for the assignment of metadata. Note that, in cases where metadata has multiple values or hierarchical values, those values may be divided and managed as separate case data pieces (metadata pieces). In the present embodiment, case data pieces are read and acquired from the case management unit 301 (second acquisition).

In the present embodiment, image data that includes case data pieces managed by the case management unit 301 is stored in the external storage device 104. However, it may be stored in computer devices on networks, digital cameras, or digital video recorders, for example, and may be acquired through the communication interface 107. Also, the save locations of image data are not limited thereto.

An assignment target acquisition unit 302 acquires image data (hereinafter referred to as "estimation target data") to which metadata is to be assigned. Some possible metadata pieces have previously been assigned to the estimation target data. As described later, estimation is performed using such metadata that has previously been assigned to estimation target data and using case data, from which metadata to be assigned to the estimation target data (hereinafter referred to as "estimation target metadata") is determined.

Estimation target data (image data) is acquired by the external storage device 104 that obtains image data specified by the input device 109. Alternatively, it may be acquired from computer devices on networks or imaging equipment such as digital cameras through the communication interface 107. As another alternative, it may automatically be acquired by imaging equipment detecting its connection to the communication interface 107. As yet another alternative, in cases where the metadata assigning device according to the present embodiment is configured as a server device, image data may be acquired from a client device through the communication interface 107. As still another alternative, the assignment target acquisition unit 302 may acquire only the metadata 201 corresponding to image data as estimation target data without acquiring the image body data 207 (first acquisition).

Metadata (estimation target metadata) to be assigned to estimation target data is determined and acquired from estimation based on preset case data and metadata that has already been assigned to the acquired image data. However, it may be specified by the input device 109 or may be read from a predetermined configuration file recorded in the external storage device 104. Alternatively, it may be held in advance. As another alternative, it may be specified upon request from a client device in cases where the metadata assigning device according to the present embodiment is configured as a server device. Note that the method for acquiring image data and metadata is not limited to the examples described herein.

Now, the description will outline the basic idea of the estimation method used in the present embodiment and the terms used in the specification and will then return to the example of FIG. 3. In the present embodiment, estimation target metadata to be assigned to estimation target data acquired by the assignment target acquisition unit 302 is estimated using case data pieces managed by the case management unit 301. Here, a k-nearest-neighbor discriminator is primarily used as an discrimination method. Now, such a k-nearest-neighbor discriminator will be described.

The k-nearest-neighbor discriminator is a kind of method for determining labels for test data that has no labels from training data that includes sets of feature vectors and labels. Specifically, k training data pieces that have similar feature vectors to that of test data are selected from among given training data pieces, and the most common label from among those of the selected training data pieces is determined as a label of the test data. Similarities among feature vectors may be determined using the Euclidean distance between vectors, for example.

Note that the discrimination method according to the present embodiment is not limited to the k-nearest-neighbor discriminator. For example, other discrimination methods such as a support vector machine (SVM) may be used. In cases of using discrimination methods that need prior leaning, prior learning may be performed using image data (case data) in the case management unit 301.

In order to adopt such discrimination methods into the estimation of metadata, training data, test data, labels, and feature vectors used in the k-nearest-neighbor discriminator need to be associated with data used in the present embodiment. Training data may be associated with a set of case data pieces (hereinafter referred to as an "estimation case-data set"), test data may be associated with estimation target data, and labels may be associated with estimation target metadata. Feature vectors need to be configured in correspondence with the properties of estimation target metadata. For example, in cases of estimating "place names," they may be estimated using shooting positions as feature vectors. Such metadata that is used as a feature vector is hereinafter referred to as "feature metadata."

Refer back to the description of FIG. 3. A status analysis unit 303 analyzes the "status" in deriving estimation target metadata to be assigned to estimation target data. In the present embodiment, there are four statuses, namely, "hierarchical," "unregistered," "mixed," and "determined." Now, those statuses will be described in sequence.

Some metadata pieces have a hierarchy. One example is "place names." For example, the place name "Tokyo" is under the category of "Japan." For such a hierarchical metadata piece, just a simple application of the k-nearest-neighbor discriminator is not enough. This is because different metadata values may be assigned to the same place. For example, there are cases where travelers from abroad assign "Japan" as a place name to their image data captured during their sightseeing. Meanwhile, there are also cases where Japanese people assign "Tokyo" as a place name to their image data captured during sightseeing in Tokyo. As exemplified by those two cases, different metadata values may be assigned as a place name to the same shooting position depending on what level the data is regarded in its hierarchy. In such cases, estimation needs to be performed in consideration of data hierarchies.

Figures 4, 5:
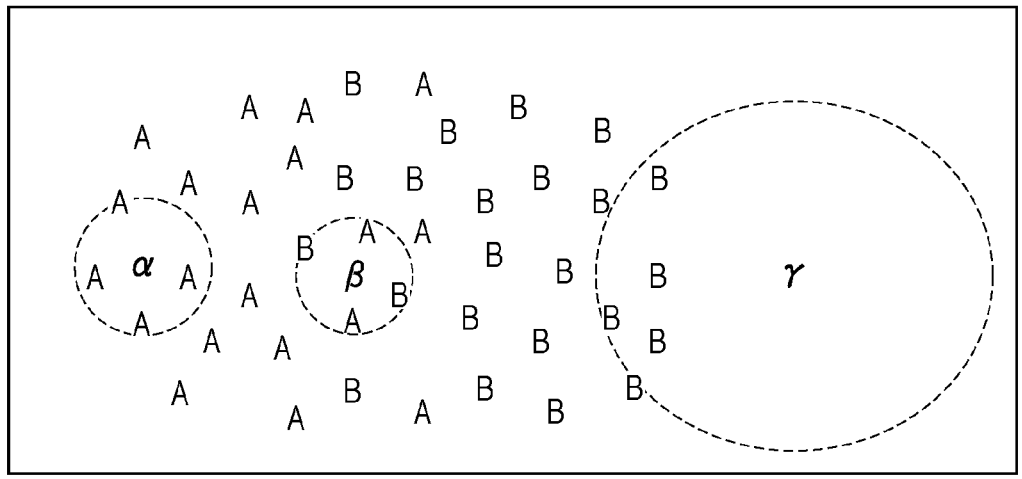
FIG. 4 is a conceptual view showing an example of the distribution of case data pieces and estimation target data pieces.
FIG. 5 illustrates an example of a table that holds information indicating a hierarchical structure.

Next, to explain the other statuses "unregistered," "mixed," and "determined," the case where "place names" are used as estimation target metadata and "shooting positions" are used as feature metadata is exemplified with reference to FIG. 4. FIG. 4 illustrates an example in which case data pieces and estimation target data pieces are plotted so as to visualize their distribution, using the latitudes and longitudes of their shooting positions as vertical and horizontal axes, respectively.

In FIG. 4, the upper-case alphabet letters A and B represent case data pieces that indicate place names A and B, respectively. Here, the alphabet letters (A, B) correspond to labels, and their shooting positions (coordinates on the vertical and horizontal axes) correspond to feature metadata pieces as feature vectors. The lower-case Greek letters $\alpha$, $\beta$, and $\gamma$ in FIG. 4 represent image data pieces (estimation target data pieces) acquired by the assignment target acquisition unit 302, and the positions of $\alpha$, $\beta$, and $\gamma$ in FIG. 4 correspond to their shooting positions. Referring to four case data pieces around the estimation target data piece $\alpha$, it is found that only the case data pieces A are around the estimation target data piece $\alpha$. In this status, the value is definitively determined as "A" by the k-nearest-neighbor discriminator. Thus, this status is determined to be the "determined" status.

Meanwhile, referring to four case data pieces around the estimation target data piece $\beta$, the case data pieces A and B are mixed therearound. Because of such mixture of the case data pieces A and B, this status is determined as "mixed." Referring also to four case data pieces around the estimation target data piece $\gamma$, it is found that every case data piece is far from the estimation target data piece $\gamma$. In this case, it is conceivable that the value to be assigned as case data to the estimation target data piece $\gamma$ has not yet been acquired. This status is thus determined as "unregistered." Note that the detailed contents of such distribution determination method will be described later with reference to the flow chart in FIG. 10.

A selective estimation unit 304 selects any one of a simple estimation unit 305, a duplicate estimation unit 306, and a hierarchical estimation unit 307 based on the "status" obtained by the status analysis unit 303 and causes the selected unit to perform estimation. Then, estimation results (including "non-estimable" results) are acquired from the one of those estimation units 305 to 307. For example, in cases where there is only the "mixed" status, the duplicate estimation unit 306 is selected. The detailed contents of the process will be described later with reference to the flow chart in FIG. 8.

The simple estimation unit 305 obtains results by simply applying the k-nearest-neighbor discriminator to feature metadata (feature vectors) of estimation target data (test data) and feature metadata of case data (training data). The detailed contents of the process will be described later with reference to the flow chart in FIG. 11.

The simple estimation unit 305, however, does not always select appropriate metadata in cases of the "mixed" status. Possible situations where the "mixed" status occurs will be described exemplifying cases where place names are derived. For example, in cases where events are held in parks or convention halls, specially built sites are often provided. Specifically, there are cases where a commercial vehicle show is held at one site in one day, and a yacht exhibition is held at the same site in another day. In such cases, if booth names in the site are used as place names, users will assign different place names to the same shooting position each day as the names of shooting places. In this case, data needs to be discriminated in consideration of not only shooting positions but also shooting dates and times, for example. In such a "mixed" status, the duplicate estimation unit 306 determines new metadata to be considered and performs estimation.

In deriving estimation target metadata, the duplicate estimation unit 306 detects new metadata to be considered and performs estimation after adding the new metadata to be considered to feature metadata. For example, in cases where "place names" are used as estimation target metadata, in the above-described example of exhibition halls, "shooting times" are detected as new metadata to be considered. Then, "place names" are estimated using "shooting positions" and "shooting times" as feature metadata. The detailed contents of the process will be described later with reference to the flow chart in FIG. 12.

The hierarchical estimation unit 307 performs estimation in consideration of a hierarchy of estimation target metadata. In the present embodiment, the metadata assigning device holds a hierarchical structure for every estimation target metadata piece and determines an estimation target metadata piece from the higher level. FIG. 5 illustrates an example of a table that shows hierarchical structures of metadata pieces held in the metadata assigning device. In FIG. 5, hierarchical structures between values are indicated by sets of parent metadata and child metadata. If the highest-level flag is ON, it indicates that the parent metadata has no higher-level parent metadata. Using this, the highest-level metadata is determined and then its child metadata is determined. The detailed contents of the process will be described later with reference to the flow chart in FIG. 13.

The assignment target writing unit 308 embeds the metadata derived by the selective estimation unit 304 into metadata of image data acquired as estimation target data and outputs resultant data. Examples of the data output destination include the external storage device 104, and imaging equipment and client devices that are connected through the communication interface 107. Note that, in cases where the assignment target acquisition unit 302 acquires only metadata, metadata of image data that is associated with the derived metadata may be rewritten. Note that the method for outputting image data and metadata is not limited thereto.

Metadata Assignment Process

Next, the process performed by the metadata assigning device according to the present embodiment will be described with reference to the flow chart in FIG. 6. In S601, the assignment target acquisition unit 302 acquires image data (to which metadata has been assigned). This image data is assumed as estimation target data.

In S602, the assignment target acquisition unit 302 identifies the kinds of metadata that are estimable based on the kinds of metadata that have been assigned to the image data, and organizes them in a list of metadata pieces (estimation target metadata pieces) to be derived from estimation. The (kinds of) estimation target metadata may be identified based on correspondences between estimation target metadata and feature metadata (hereinafter referred to "essential feature metadata") that is essential in estimating the estimation target metadata, the correspondences having been determined and held in advance.

Figures 6, 7:
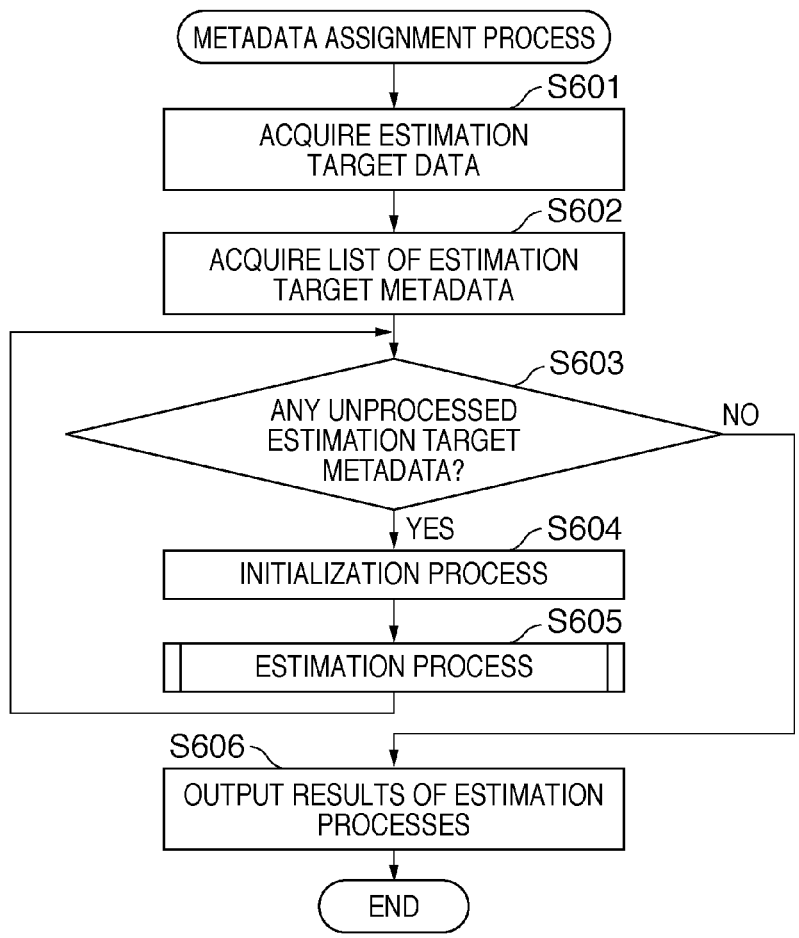
FIG. 6 is a flow chart showing an example procedure performed by the metadata assigning device.
FIG. 7 illustrates an example of an estimation rule table.

Specifically, such correspondences may be held in an estimation rule table as illustrated in FIG. 7. FIG. 7 illustrates an example of the estimation rule table that shows correspondences between estimation target metadata 701 and feature metadata (essential feature metadata 702) of estimation target data that is essential in estimating the estimation target metadata. For example, in order to estimate event names, shooting dates and times and shooting positions need to be assigned in advance to estimation target data.

Thus, for example in cases where estimation target data only has "shooting positions" assigned thereto, "place names" are estimable with use of the estimation rule table in FIG. 7, so "place names" are listed in S602. Note that, even though considered as estimable according to the above-described method, metadata whose value has already been assigned to image data may be excluded from a list.

In S603, it is determined whether or not there is any unprocessed estimation target metadata piece in the list created in S602. Since estimation target metadata pieces that have been processed in later-described steps S604 and S605 are deleted from the initial list, if the list is empty, it is determined that there is no unprocessed estimation target metadata. Alternatively, a processed flag may be provided in the list and determination may be made depending on whether or not any estimation target metadata remains whose processed flag is OFF. If there is any unprocessed estimation target metadata piece (YES in S603), the process proceeds to S604. If there is no unprocessed estimation target metadata piece (NO in S603), the process proceeds to S606.

In S604, an unprocessed estimation target metadata piece (or type) is selected from the list, and feature metadata of estimation target data used for estimation and an estimation case-data set are initialized. For example, feature metadata used for estimation is assumed as essential feature metadata that is associated with estimation target metadata in the estimation rule table in FIG. 7. Then, case data pieces that include feature metadata and estimation target metadata in the case management unit 301 are assumed as an estimation case-data set.

In S605, an estimation process for deriving estimation target metadata from estimation is performed. The specific contents of the process will be described later with reference to the flow chart in FIG. 8. The process then returns to S603. In this way, the processing of S604 and S605 is performed for each estimation target metadata piece. When all estimation target metadata pieces have been processed (NO in S603), the process proceeds to S606.

In S606, the assignment target writing unit 308 assigns the metadata obtained from the estimation in S605 to image data. However, an estimation target metadata piece that has resulted in "non-estimable" is not assigned to image data. Note that, while the flow chart in FIG. 6 shows the case where the assignment target acquisition unit 302 acquires and processes a single image data piece, multiple image data pieces may be acquired and processed. In cases of acquiring multiple image data pieces, the processing from S602 to S606 is applied to each of the image data pieces.

Estimation Process

The estimation process in S605 is described with reference to the flow chart in FIG. 8. FIG. 8 is a flow chart showing the detailed procedure in the estimation process. In determining the values of estimation target metadata pieces, what estimation process is to be performed varies depending on the features of estimation target metadata pieces and a case-data set used for discrimination (estimation case-data set). Thus, the status for deriving estimation target metadata, that is, the relationship between feature metadata of estimation target data and feature metadata included in case data is determined. In the present embodiment, four statuses are assumed, namely "hierarchical," "unregistered," "mixed," and "determined." In S801, those statuses are listed so as to create a status list. The detailed contents of the process will be described later with reference to the flow chart in FIG. 10.

In S802 to S805, an estimation process corresponding to the status obtained in S801 is selected from a process selection table and performed. The process selection table is as illustrated in FIG. 9. The process selection table contains process selection rules, each of which is expressed in a set of "ID" 901, "priority" 902, "status" 903, "process" 904, and "invalidation flag" 905. Using this table, an appropriate process selection rule is selected for each status, and an estimation process associated with the "process" 904 is performed. A specific selection method is described in line with S802 to S805. The specific contents of the "process" 904 will be separately described later.

In S802, process selection rules whose statuses 903 match any of the statuses obtained in S801 and whose invalidation flags 905 are OFF are listed. The listing may be made by, for example, holding the IDs 901 in a storage device such as the RAM 103. For example, in cases where the process selection table is as illustrated in FIG. 9 and the status list obtained in S801 includes "hierarchical" and "unregistered," the process selection rules with ID numbers "1" and "2" are listed.

In S803, the process selection rule with the highest priority is selected from the list obtained in S802. Then, the invalidation flag of the selected process selection rule is set to ON. Note that, in the present embodiment, a higher priority value 902 means a higher priority. For example, in cases where the process selection rules with ID numbers "1" and "2" are included in the list, the process selection rule with the highest priority herein, that is, the one with ID number "1" that has the highest priority value of 4, is selected from the list. Then, the invalidation flag of the process selection rule with ID number "1" is set to ON.

In S804, results are obtained by performing the estimation process associated with the process selection rule selected in S803. For example, if the process selection rule with ID number "1" is selected in S803, the result of "non-estimable" is obtained. If the process selection rule with ID number "2" is selected in S803, results are obtained by performing the hierarchical estimation process. The details of the estimation process will be described later.

In S805, the invalidation flag of the process selection rule selected in S803 is set to OFF. This completes the estimation process and the process returns to S603 in FIG. 6. Note that the processing from S802 to S805 is performed by the selective estimation unit 304.

Status-List Creation Process

Next, the status-list creation process performed in S801 in FIG. 8 is described with reference to the flow chart in FIG. 10. First, an empty status list is prepared in S1001. For example, a variable-length array is prepared for storing values associated with statuses.

In S1002, it is determined whether or not an estimation target metadata piece has a hierarchy. For example, information indicating the presence or absence of a hierarchy (hierarchical information) may be stored in the abovementioned estimation rule table in FIG. 7 and it may be referred to at the time of determination. If the estimation target metadata piece is determined as having a hierarchy (YES in S1002), the process proceeds to S1003. If it is determined as having no hierarchy (NO in S1002), the process proceeds to S1004.

In S1003, "hierarchical" is added to the status list. Then, the process proceeds to S1004. In S1004, a predetermined number (k) of features vectors of the estimation case-data set are collected as case data pieces in order from those nearest to the feature vector of the estimation target data piece. Then, the distance from the feature vector of the estimation target data piece to the farthest one of the collected case data pieces is given as L (maximum distance value L). Note that the distance between feature metadata pieces may be assumed as the Euclidean distance between feature metadata pieces as feature vectors. For example, in cases of using "shooting positions" as feature metadata pieces, the distance between feature metadata pieces may be computed using the latitudes and longitudes of the shooting positions of those metadata pieces.

In S1005, it is determined whether or not the distance L obtained in S1004 is equal to or higher than a predetermined threshold value. If the distance L is equal to or higher than the threshold value, it means that the estimation case-data set does not include the value of an estimation target metadata value to be assigned to the estimation target data piece. If the distance L is equal to or higher than the threshold value (YES in S1005), the process proceeds to S1006. If the distance L is lower than the threshold value (NO in S1005), the process proceeds to S1007.

In S1006, "unregistered" is added to the status list. This completes the status-list creation process and the process proceeds to S802 in FIG. 8. Meanwhile, in S1007, it is determined whether or not the estimation target metadata pieces of the k case data pieces obtained in S1004 have substantially the same value. This may be determined, for example, depending on whether or not 90 percent or more of the case data pieces have the same value (if so, it is determined that they are "substantially the same"). This determines whether or not the value of the estimation target metadata piece to be assigned to the estimation target data piece is determined. Then, if it is determined that the values of the estimation target metadata pieces of the k case data pieces are substantially the same (YES in S1007), the process proceeds to S1008. If not (NO in S1007), the process proceeds to S1009.

In S1008, "determined" is added to the status list. This completes the status-list creation process and the process proceeds to S802 in FIG. 8. Meanwhile, in S1009, "mixed" is added to the status list. This completes the status-list creation process and the process proceeds to S802 in FIG. 8.

The above-described processing from S1001 to S1009 is performed by the status analysis unit 303. Note that the processing from S1004 to S1008 is not limited to the above-described method. For example, it is also assumed that the discriminator not only returns discrimination results but also returns the result indicating that training data includes no results to be discriminated, or it returns discrimination results together with their confidence factors. At this time, results obtained by the discriminator may be used in the determination process in S1005 or S1007.

As describe above, an estimation method to be used is determined by analyzing whether or not the distance L is equal to or higher than a threshold value in the distribution and setting different values in the status list, which effectively prevents estimation from being performed with low precision in cases where estimation is practically difficult. Moreover, in the present embodiment, k estimation metadata pieces of the same kind are selected in order from those that have smaller intervector distances from the already assigned metadata value, and then it is analyzed whether or not a predetermined ratio or more of their corresponding estimation metadata pieces of another kind have the same value. Then, as described later, an estimation method is determined based on the analysis results. This allows an appropriate estimation method to be selected in both cases where metadata values are definitively estimated and where such estimation is not feasible, thus allowing high-precision estimation of appropriate metadata values.

Simple Estimation Process

Figure 11:
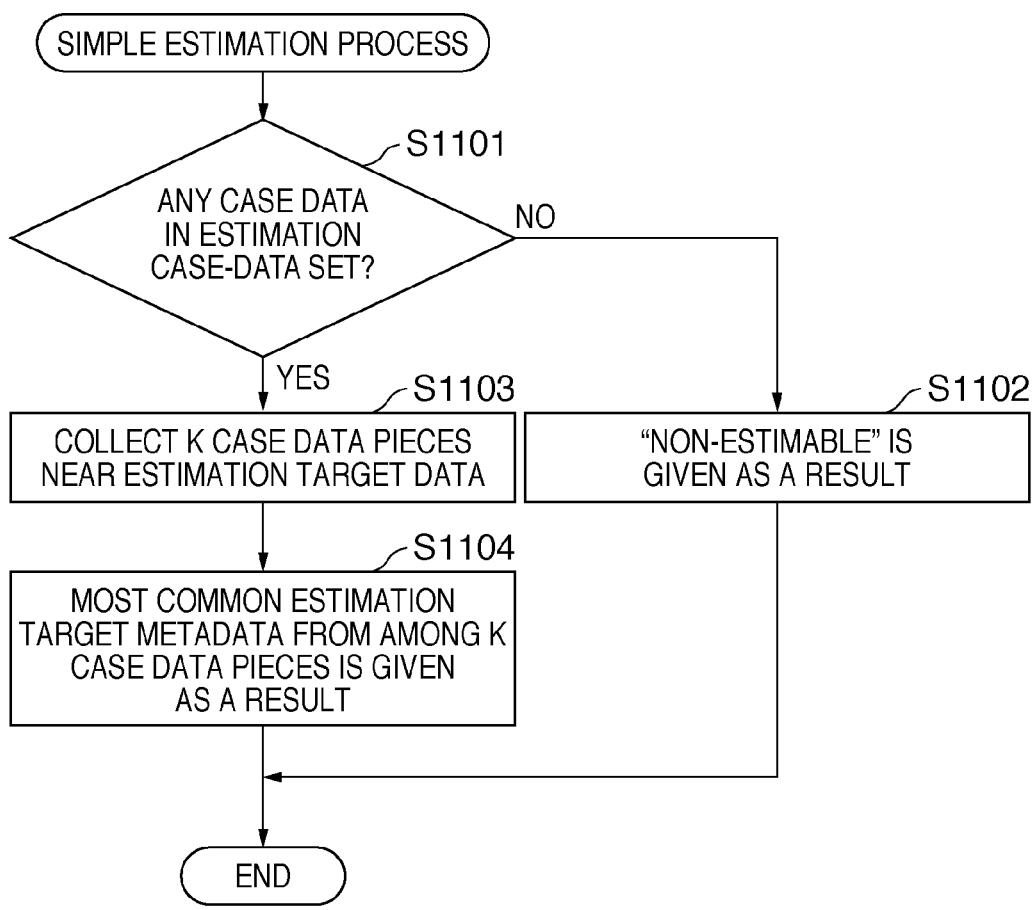
FIG. 11 is a flow chart showing an example procedure in a simple estimation process.
Figure 12:
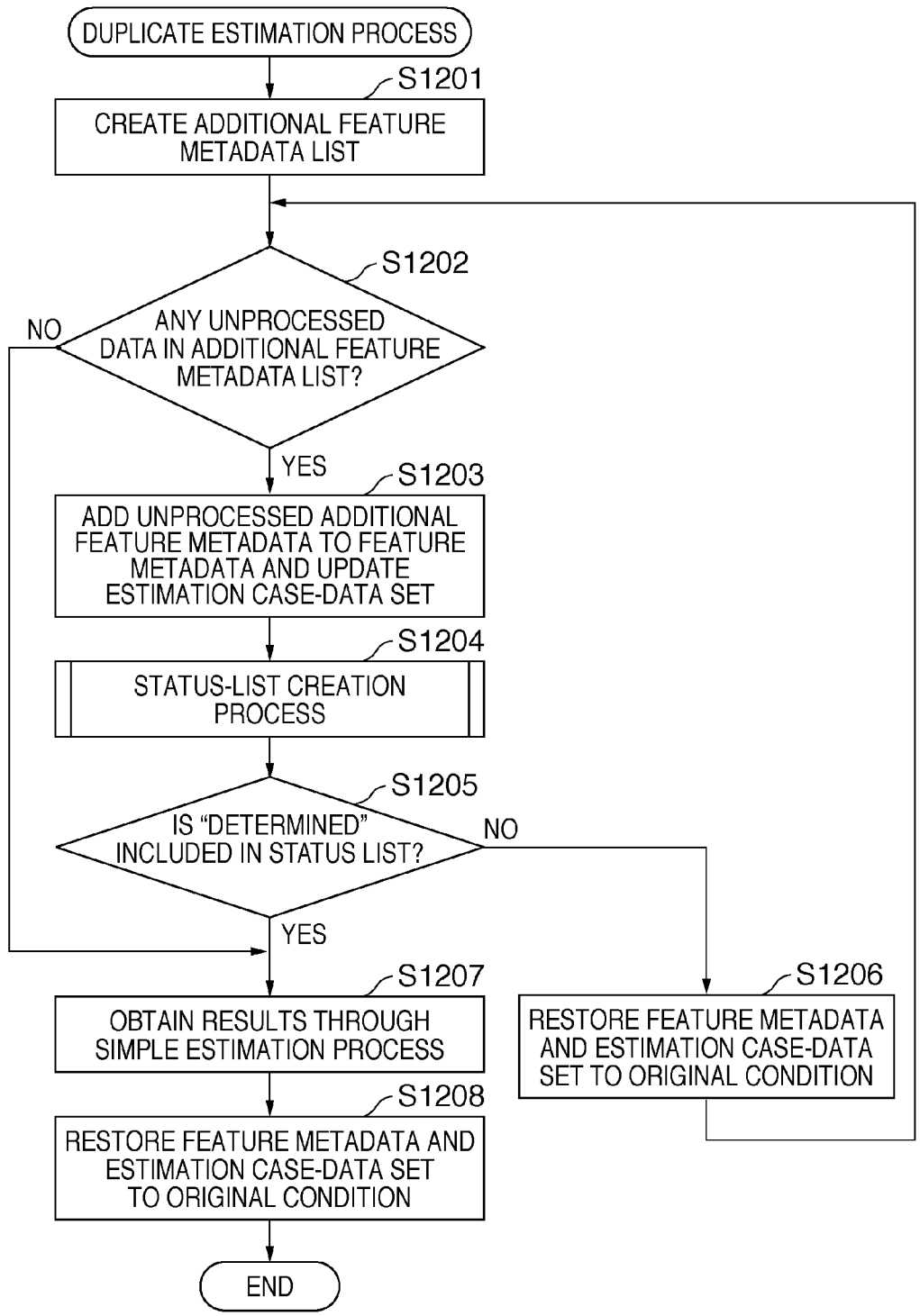
FIG. 12 is a flow chart showing an example procedure in a duplicate estimation process.
Figures 13, 14:
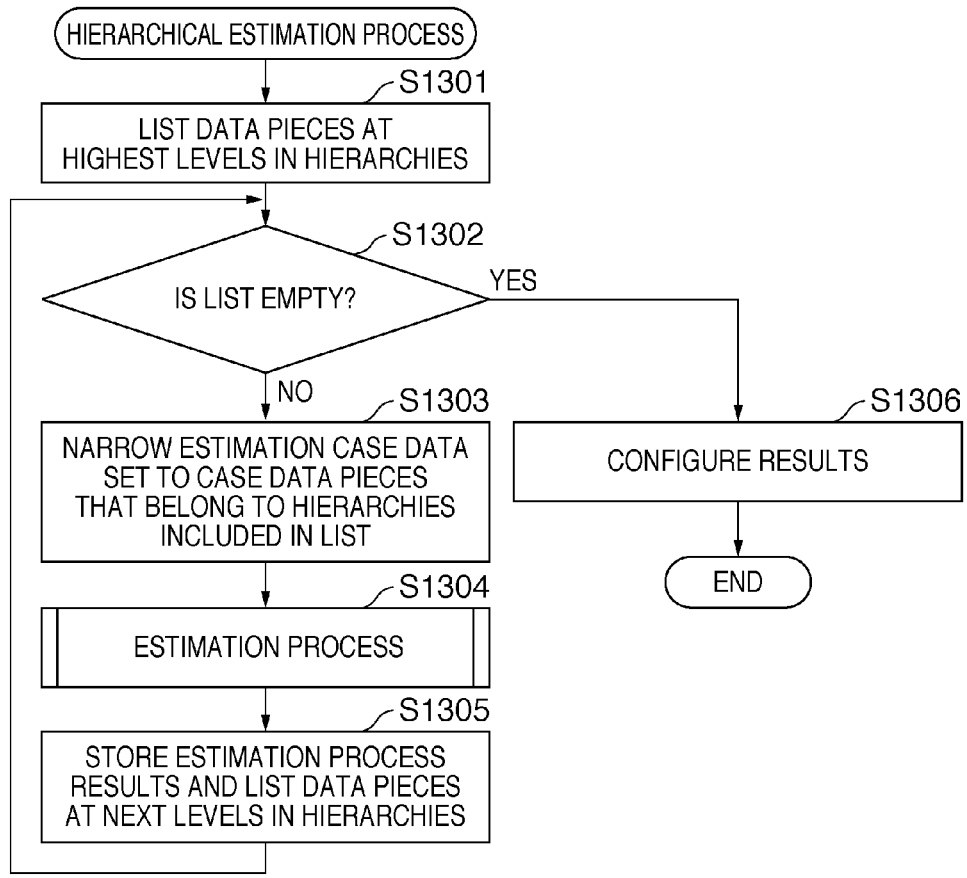
FIG. 13 is a flow chart showing an example procedure in a hierarchical estimation process.
FIG. 14 illustrates an example of an estimation rule table that contains additional feature metadata.

Next, the processes performed by the simple estimation unit 305, the duplicate estimation unit 306, and the hierarchical estimation unit 307 will be described with reference to the flow charts in FIGS. 11, 12, and 13. First, the process performed by the simple estimation unit 305 according to the present embodiment is described with reference to the flow chart in FIG. 11. This process corresponds to the simple estimation process described in the process selection rule with ID number "4" in the process selection table in FIG. 9.

In S1101, it is determined whether or not the estimation case-data set contains case data pieces. For example, it is determined whether or not the estimation case-data set contains the number of case data pieces equal to or higher than a threshold value. If it is determined that case data pieces exist (YES in S1101), the process proceeds to S1103. If not (NO in S1101), the process proceeds to S1102.

In S1102, the estimation result of "not estimable" is obtained and the simple estimation process is completed. Meanwhile, in S1103, the distances between the feature metadata piece of the estimation target data piece and the feature metadata pieces of the case data pieces are computed, and k case data pieces are listed in order from those nearest to the feature metadata piece of the estimation target data piece. Then, in S1104, the most common value of the estimation target metadata pieces of the case data pieces listed in S1103 is determined as an estimation result. Then, the simple estimation process is completed.

Duplicate Estimation Process

Next, the process performed by the duplicate estimation unit 306 according to the present embodiment will be described with reference to the flow chart in FIG. 12. This process corresponds to the duplicate estimation process described in the process selection rule with ID number "3" in the process selection table in FIG. 9.

First, an additional feature metadata list is created in S1201. Additional feature metadata pieces refer to feature metadata pieces that are accessorily used with minimum essential feature metadata pieces in order to perform estimation more properly, and the additional feature metadata list refers to a list of such additional feature metadata pieces. In the present embodiment, the aforementioned estimation rule table stores candidate additional feature metadata pieces in association with estimation target metadata pieces, and this estimation rule table is referred to in creating an additional feature metadata list. FIG. 14 illustrates an example of the estimation rule table in which additional feature metadata pieces are associated with estimation target metadata pieces. For example, in cases where the estimation rule table is configured as illustrated in FIG. 14 and "place names" are used as estimation target metadata pieces (1401), "shooting dates and times" and "photographer information" are listed in the list of additional feature metadata pieces (1402). Alternatively, in consideration of data combinations, "shooting dates and times," "photographer information," and "shooting dates and times and photographer information" may be listed separately. The last combination of "shooting dates and times and photographer information" indicates that "shooting dates and times" and "photographer information" are both used as additional feature metadata pieces. Note that the method for creating an additional feature metadata list is not limited thereto, and for example, all metadata pieces that have inherently been assigned to feature metadata pieces but are not used may be listed.

In S1202, it is determined whether or not there is an unprocessed additional feature metadata piece in the additional feature metadata list obtained in S1201. Since additional feature metadata pieces that have been processed in later-described steps will be deleted from the initial list, if the list is empty, it is determined that there is no unprocessed additional feature metadata piece. Alternatively, a processed flag may be provided in the list and determination may be made depending on whether or not an additional feature metadata piece remains whose processed flag is OFF. If an unprocessed additional feature metadata piece exists (YES in S1202), the process proceeds to S1203. If not (NO in S1202), the process proceeds to S1207.

In S1203, an unprocessed additional feature metadata piece is selected from the additional feature metadata list and is added to the feature metadata piece used for estimation. Then, the estimation case-data set is narrowed down to those case data pieces that include updated feature metadata pieces.

In S1204, a status list is created through the status analysis process. This process is similar to the process (the status-list creation process) in the aforementioned flow chart in FIG. 10. Note that, in cases where photographer information is added to feature metadata, it is conceivable that the distances between an estimation target metadata piece and case data pieces in S1004 will take values that increase with increasing distance in human relations between users who captured those data pieces, such as in the order of "oneself," "family member," "friend," and "acquaintance".

In S1205, it is determined whether "determined" is included in the status list. This determines whether or not estimation has been determined by the consideration of the additional feature metadata piece added in S1203. If "determined" is included in the status list (YES in S1205), the process proceeds to S1207. If not (NO in S1205), the process proceeds to S1206.

In S1206, the feature metadata piece and the estimation case-data set are restored to their original condition. For example, information about the feature metadata piece and the estimation case-data set may be previously held at the start of the process and used for overwriting. The process then returns to S1202.

In S1207, results are obtained through the simple estimation process using the feature metadata piece with the additional feature metadata piece. The contents of the simple estimation process are as in the above-described flow chart in FIG. 11.

In S1208, the feature metadata piece and the estimation case-data set are restored to their original condition. For example, information about the feature metadata piece and the estimation case-data set may be previously held at the start of the process and used for overwriting. This completes the duplicate estimation process.

Hierarchical Estimation Process

Next, the process performed by the hierarchical estimation unit 307 according to the present embodiment will be described with reference to the flow chart in FIG. 13. This process corresponds to the hierarchical estimation process described in the process selection rule with ID number "2" in the process selection table in FIG. 9.

In S1301, feature metadata pieces at the highest level in their hierarchies are listed from among feature metadata pieces used for estimation. In the present embodiment, since hierarchical structures are previously held in a table (FIG. 5), this table is referred to in order to list parent metadata pieces whose highest-level flags are ON.

In S1302, it is determined whether or not the list created in S1301 or S1305 is empty. An empty list indicates that the process has been completed. If the list is empty (YES in S1302), the process proceeds to S1306. If the list is not empty (NO in S1302), the process proceeds to S1303.

In S1303, the estimation case-data set is narrowed down to case data pieces that belong to the hierarchies included in the list created in S1301 or S1305. For example, consider the case where, when "place names" are used as estimation target metadata pieces, "Japan" and "U.S." are included in the list of metadata pieces that are at the highest levels in their hierarchies. At this time, the current estimation case-data set is narrowed down to case data pieces whose "place names" are either "Japan" or "U.S.," which forms a new estimation case-data set.

In S1304, the estimation process is performed using the estimation case-data set obtained in S1303. This estimation process corresponds to the process in the above-described flow chart in FIG. 8. At the time of executing this estimation process, the invalidation flag of the process selection rule with ID number "2" in the process selection table in FIG. 9 is ON. Thus, the hierarchical estimation process will not be selected. In addition, even though the statuses such as "hierarchical" and "mixed" are included in the estimation case-data set obtained in S1303, an appropriate estimation process is selected along with the flow chart in FIG. 8 (S803) and appropriate results are obtained (S804).

In S1305, the result obtained in S1304 is stored. Then, data pieces at the next level in the hierarchies are listed. Thereafter, the process returns to S1302. Specifically, child metadata pieces whose parent metadata pieces have the same value as the above result are listed from FIG. 5. For example, if the result is "Japan," "Tokyo" and "Kyoto" are listed as child metadata pieces.

In S1306, the results stored in S1305 are given as results of this hierarchical estimation process. However, if no results are stored, "non-estimable" is given as a result. Then, the hierarchical estimation process is completed.

As described above, in the present embodiment, an estimation method for estimating metadata pieces to be newly assigned is determined based on the distribution of the values of estimation metadata pieces of other kinds that correspond to the estimation metadata pieces of the same kind as the already assigned metadata pieces of the estimation target data piece, and then estimation is performed. That is, metadata pieces to be newly assigned are determined using an optimum estimation method corresponding to the data distribution, which allows high-precision determination of appropriate metadata pieces irrespective of the properties of data pieces prepared in advance for the estimation of metadata pieces.

Moreover, in the present embodiment, correspondence information (estimation rule table) is stored in advance that indicates correspondences between the kinds of already assigned metadata pieces and the kinds of metadata pieces whose values are estimable from the values of the already assigned metadata pieces. Then, this correspondence information is referred to in order to specify the kinds of metadata pieces that correspond to the kinds of the already assigned metadata pieces of the target data piece, as the kinds of metadata pieces to be newly assigned to the target data piece. This allows data necessary for estimation to be specified through a simple process from the data that has previously been prepared for the estimation of metadata.

Note that, in the present embodiment, four statuses are assumed for the estimation of metadata. Then, the metadata assigning device has been described that selects a metadata estimation method according to the status. However, statuses for which the configuration of the present embodiment is intended are not limited thereto. For example, there are other possible statuses, such as "multivalued," in which metadata is supposed to have multiple values. Specifically, some place names may have alternate names, such as Chomolungma for Everest. In such cases, the above-described estimation processes are not enough and another estimation method that enables assignment of multiple values is necessary. For example, the following process is associated with the case where the priority value is "3.5" and the status is "mixed" in the process selection table. This process is such that a table that associates the same value with multiple metadata pieces is stored in advance, and an estimation case-data set is prepared in which metadata pieces regarded as having the same value are replaced with a single value. Then, the estimation process in the flow chart in FIG. 8 is called, and after results are obtained, the above replaced contents are replaced with the multiple metadata values according to the table. Since the method for specifying the status and the method for selecting the status are configured according to the assumed status, they are not limited to the examples described in the present embodiment. Also, the estimation method corresponding to the status as described herein is not limited to the examples described above.

The above description of the present embodiment has given the case where hierarchical structures used for the hierarchical estimation process are given in advance. In the present embodiment, the following describes a configuration (hierarchical-structure construction device) in which hierarchical structures are automatically constructed according to the distribution of case data pieces. According to the configuration of this embodiment, four statuses, namely "hierarchical," "unregistered," "mixed," and "determined" are identified based on only the distribution of case data pieces.

In the present embodiment, clustering is performed in order to cluster the distribution of feature metadata values of other kinds that correspond to feature metadata pieces of the same kind as the target metadata piece for which the presence or absence of a hierarchy is determined. Then, inclusion relations between clusters are analyzed. From this, the hierarchy of the target metadata piece is determined. This allows the hierarchy of metadata to be automatically determined through a simple process.

As described above, some metadata pieces such as "place names" have a hierarchy. For example, in cases of commercial vehicle shows, "passenger cars zone" and "two-wheel vehicles zone" may be under the category of "exhibition hall". In cases of such hierarchical data, case data pieces whose "place names" are either "exhibition hall" or "passenger cars zone" are plotted based on their shooting positions. A resultant distribution of the case data pieces is often such that "passenger cars zone" is included in "exhibition hall". The present embodiment utilizes such data properties in order to acquire hierarchical structures from case data pieces.

Configuration of Hierarchical Structure Construction Device

Figure 15:
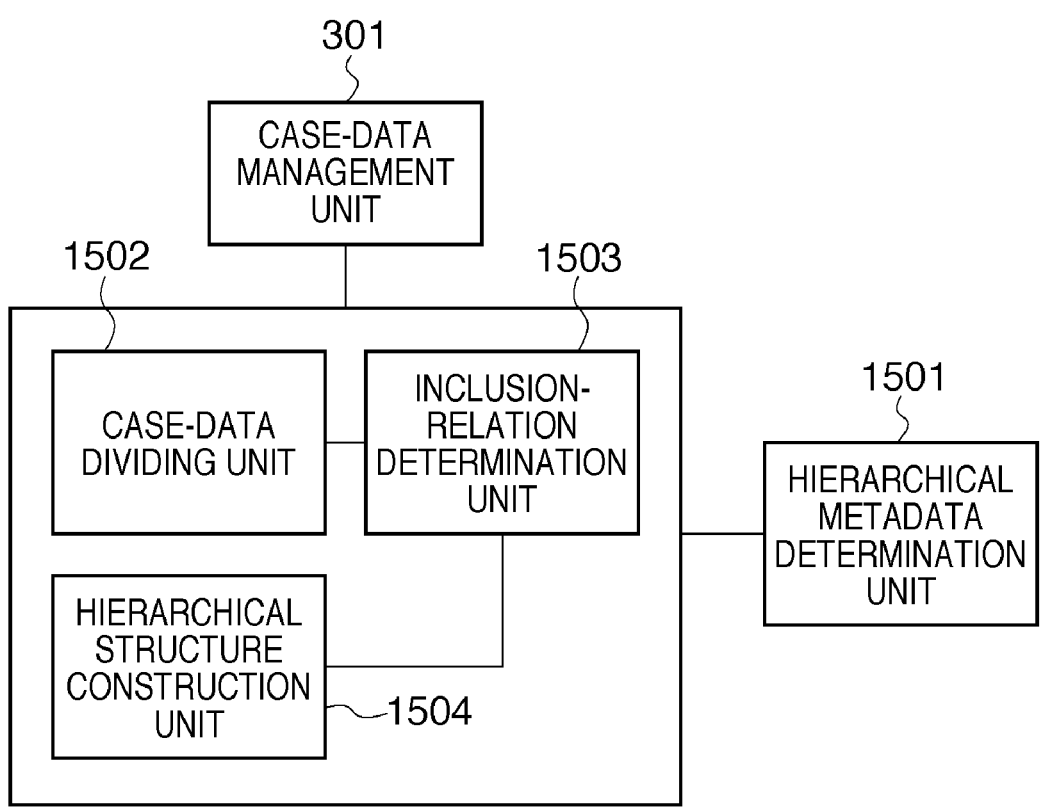
FIG. 15 illustrates example modules that constitute a hierarchical-structure construction device.

FIG. 15 illustrates a configuration of a hierarchical structure construction device according to the present embodiment. In FIG. 15, a case management unit 301 is the same as that in FIG. 3 described above in the present embodiment.

A hierarchical metadata determination unit 1501 determines metadata pieces (hereinafter referred to as "hierarchical metadata pieces") for which a hierarchical structure is constructed from case data pieces, and metadata pieces (hereinafter referred to as "feature metadata pieces") used to detect the hierarchical structure. The hierarchical metadata pieces and the feature metadata pieces may be specified by the input device 109 or may be read from a predetermined configuration file recorded on the external storage device 104. However, the method for determining hierarchical metadata pieces and feature metadata pieces is not limited thereto.

A case-data dividing unit 1502 performs a process in which, from among case data pieces managed by the case management unit 301, those that have the same hierarchical metadata value but have different meanings are handled separately. This is for the following purposes. For example, in cases of commercial vehicle shows, it is assumed that exhibitor companies' booths further exist under the category of "passenger cars zone" or "two-wheel vehicles zone". At this time, even if the place names of two given case data pieces are both "Company A's booth," one of them may be under the category of "passenger cars zone" and the other may be under the category of "two-wheel vehicles zone". Thus, the process for separately handling such data pieces that have the same hierarchical metadata value but have different meanings is performed. This produces a set of case data pieces that have the same meaning. The detailed contents of the process will be described later with reference to the flow chart in FIG. 16.

An inclusion-relation determination unit 1503 obtains inclusion relations between case-data sets obtained by the case-data dividing unit 1502. A hierarchical structure construction unit 1504 constructs hierarchical structures from the inclusion relations obtained in the inclusion-relation determination unit 1503. The detailed contents of the process performed by those functional components will also be described later with reference to the flow chart in FIG. 16.

Hierarchical Structure Construction Process

Figure 16:
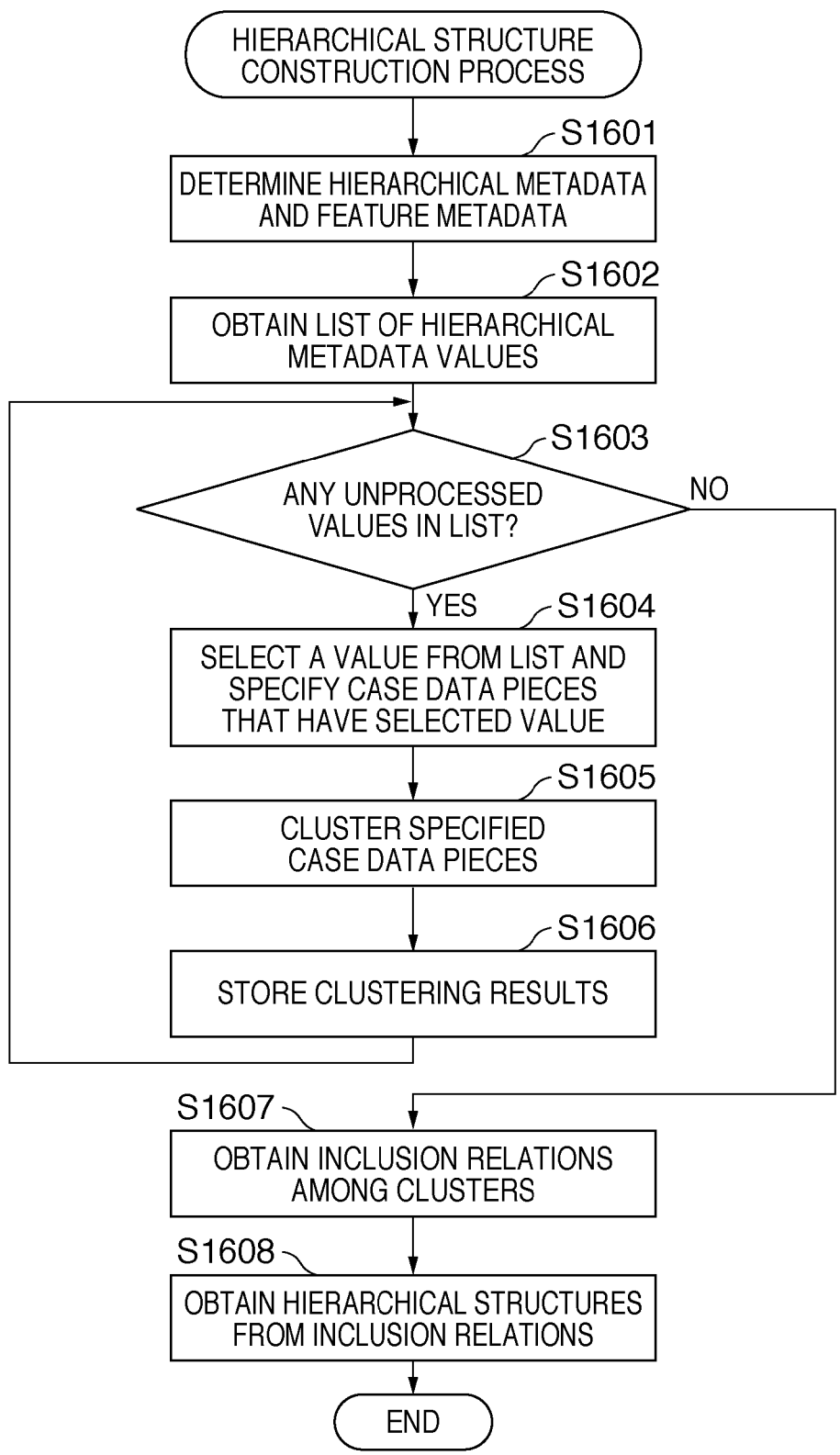
FIG. 16 is a flow chart showing an example procedure of processing performed by the hierarchical-structure construction device.

The process performed by the hierarchical structure construction device according to the present embodiment is described with reference to the flow chart in FIG. 16. First, in S1601, the hierarchical metadata determination unit 1501 determines hierarchical metadata pieces for which hierarchical structures are constructed, and feature metadata pieces used to determine hierarchical structures.

In S1602, a list of values of hierarchical metadata pieces is created. Specifically, the values of all hierarchical metadata pieces of case data pieces managed by the case management unit 301 are listed and then duplicates are excluded therefrom, the result of which is obtained as a list.

In S1603, it is determined whether or not an unprocessed value is included in the list obtained in S1602. Since values that have been processed in later-described steps S1604 to S1606 are deleted from the initial list, if the list is empty, it is determined that there is no unprocessed value. Alternatively, a processed flag may be provided in the list and determination may be made depending on whether or not a value remains whose processed flag is OFF (which means "unprocessed"). If an unprocessed value exists (YES in S1603), the process proceeds to S1604. If no unprocessed value exists (NO in S1603), the process proceeds to S1607.

In S1604, a value is selected from the list obtained in S1602. Then, case data pieces that have the selected value are specified from among the case data pieces (hierarchical metadata pieces) managed by the case management unit 301.

In S1605, clustering is applied to a set of the case data pieces specified in S1604. Clustering is performed for the following purpose. Some case data pieces may be of different kinds even if they have the same metadata value. For example, in cases of commercial vehicle shows, it is assumed that exhibitor companies' booths further exist under the categories of "passenger cars zone" and "two-wheel vehicles zone".

At this time, even if the place names of two given case data pieces are both "Company A's booth," one of them may be the Company A's booth under the category of "passenger cars zone" and the other may be the Company A's booth under the category of "two-wheel vehicles zone". In this case, those Company As' booths are different booths. Clustering is performed in order to separate such case data pieces that belong to different upper-level data pieces in hierarchies. Clustering is performed using similarities based on feature metadata pieces, and results are obtained from hierarchical clusters. Alternatively, a connected component obtained by connecting k case data pieces near the concerned case data piece may be organized into a single cluster. The clustering method according to the present embodiment is not limited thereto. Also, clustering results are not always obtained by dividing case data pieces, and all data pieces may be organized into a single cluster.

In S1606, the clustering results obtained in S1605 are stored. Specifically, "metadata values" and "cluster IDs" are stored in association with each other. Also, "cluster IDs" and "case data IDs" are stored in association with each other. The metadata values as described herein refer to the values selected in S1604. The term "cluster ID" as used herein refers to an identifier assigned in order to identify the clusters obtained in S1605. The term "case data ID" as described herein refers to an identifier for association with case data pieces managed by the case management unit 301. A table that shows correspondences between clusters and cluster IDs is referred to as a cluster table. A table that shows correspondences between case data pieces and case data IDs is also referred to as a cluster configuration table. Those tables are used in the subsequent processing as well as in a hierarchical estimation process described later. Note that the processing from S1602 to S1606 is performed by the case data dividing unit 1502.

Figures 17, 18, 19:
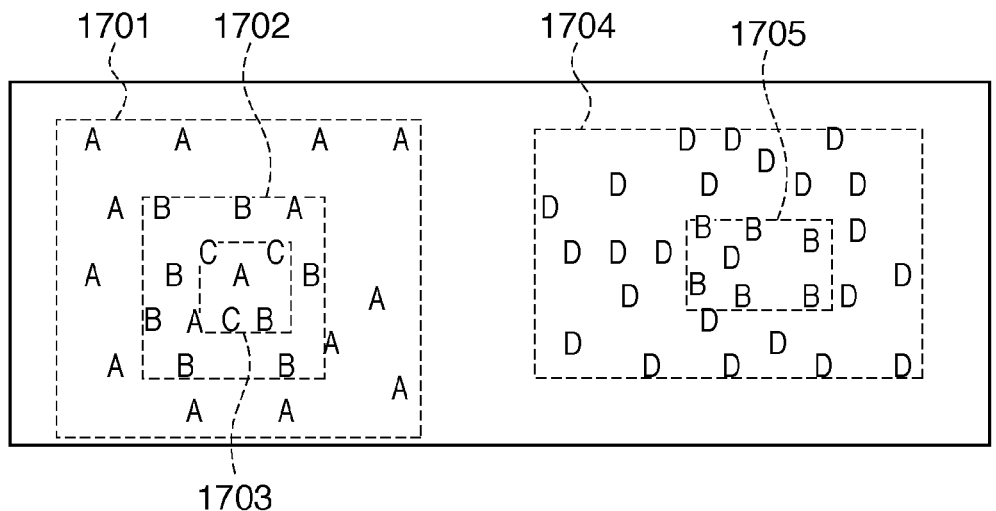
FIG. 17 is a conceptual view showing an example of results obtained by clustering case data pieces.
FIG. 18 illustrates an example of a cluster table.
FIG. 19 illustrates an example of a hierarchical structure table.

An example process is described in which the processing from S1603 to S1606 is repeated until the list is empty. For example, assume that case data pieces are distributed as illustrated in FIG. 17 based on given feature metadata. The uppercase alphabet letters in FIG. 17 represent case data pieces, and the values of hierarchical metadata pieces may be any of those alphabet letters. Rectangles 1701 to 1705 indicated by the broken lines in FIG. 17 schematically illustrate clusters obtained in S1605. It can be seen from FIG. 17 that separate clusters 1702 and 1705 are obtained from the same case data pieces B. By associating those clusters and metadata values, a cluster table is created as illustrated in FIG. 18.

In S1607, the inclusion-relation determination unit 1503 determines inclusion relations among the clusters obtained in S1605. Specifically, regions that surround clusters (in the example of FIG. 17, rectangular regions) are created, and inclusion relations among the regions are used to obtain inclusion relations among clusters. For example, a relation that a cluster A includes a cluster B is expressed as "A ⊃ B". At this time, if case data pieces are distributed as illustrated in FIG. 17 based on given feature metadata pieces, rectangular regions that surround clusters are obtained such as 1701 to 1705. Then, their inclusion relations are obtained such as "1701 ⊃ 1702," "1701 ⊃ 1703," "1702 ⊃ 1703," and "1704 ⊃ 1705". Note that, at the time of determining inclusion relations, if the cluster A covers the cluster B to some extent, it may be determined that the cluster A includes the cluster B. Specifically, if R(A∧B)/R(B) exceeds a certain value (for example, 0.95) where R(B) is the area of a rectangular region B and R(A∧B) is an overlapping region between A and B, it may be determined that the cluster A includes the cluster B. However, the method for determining inclusion relations is not limited thereto.

In addition, before creating regions that surround clusters, metadata pieces that can be noises in obtaining precise regions may be excluded. Specifically, metadata pieces included in a cluster may be limited to those that have values located within a range of a predetermined threshold value from an average value or a median value of the values of the metadata pieces included in the cluster. This excludes, for example, a metadata piece "Tokyo" that has been input as "Kyoto" in error, thus preventing an erroneous region from being created from the cluster that include metadata pieces having the value of "Tokyo".

In S1608, the hierarchical structure construction unit 1504 constructs (determines) hierarchical structures from the inclusion relations obtained in S1607. Specifically, a table (hereinafter referred to as a "hierarchical structure table") is created that holds hierarchical structures as illustrated in FIG. 5 described above. However, in the present embodiment, since cluster IDs are used instead of metadata values, the items in the table are "highest-level flag," "parent cluster IDs," and "child cluster IDs". First, "parent cluster IDs" and "child cluster IDs" are filled in according to the inclusion relations obtained in S1607. The inclusion relations, however, represent antecedent-descendent relationships instead of parent-child relationships in hierarchical structures. Thus, the inclusion relations are narrowed down to parent-child relationships. For example, "1701 ⊃ 1702," "1702 ⊃ 1703," and "1704 ⊃ 1705" are obtained from the inclusion relations obtained in FIG. 17, and they are stored in the table. Then, the "highest-level flags" of parent clusters that do not appear as child clusters are set to ON. The highest-level flags of the other parent clusters are all set to OFF. The hierarchical structure table obtained through the above-described process is as illustrated in FIG. 19. Note that, if no inclusion relation is obtained in S1607, a hierarchical structure table is not created.

In cases where this device is used together with the metadata assigning device described above in the present embodiment, hierarchical structures are constructed in advance prior to the process of the metadata assigning device. For example, immediately after S604 in the flow chart in FIG. 6, the above-described process may be performed using hierarchical metadata pieces as estimation target metadata pieces so as to construct hierarchical structures. Or, prior to S601, hierarchical structures of all estimation target metadata pieces described in the estimation rule table may be constructed in advance through the above-described process. However, the timing of the construction of hierarchical structures is not limited thereto.

Hierarchical Estimation Process

Next described is the case where hierarchical structures constructed in the present embodiment are used in the hierarchical estimation process described above in the present embodiment. The contents of this process are substantially identical to that shown in the flow chart in FIG. 13. This process differs only in that cluster IDs are used instead of metadata values in order to specify hierarchies. Hereinafter, the hierarchical estimation process according to the present embodiment will be described with reference to FIG. 13.

In S1301, data pieces at the highest levels in their hierarchies are listed. For example, in cases where a hierarchical structure table is given in advance as illustrated in FIG. 19, cluster IDs whose highest-level flags are ON are listed.

In S1302, it is determined whether or not the list created in S1301 or S1305 is empty. If the list is empty (YES in S1302), the process proceeds to S1306. If not (NO in S1302), the process proceeds to S1303.

In S1303, the estimation case-data set is narrowed down to case data pieces that belong to the hierarchies included in the list created in S1301 or S1305. In addition, estimation target metadata pieces are replaced by cluster IDs, which forms a new estimation case-data set. For example, assume that clusters "1701" and "1702" are included in the list. At this time, the current estimation case-data set is further narrowed down to case data pieces that belong to either the cluster "1701" or "1702". Specifically, the cluster configuration table is referred to so as to leave only case data pieces that are associated with either the cluster ID "1701" or "1702". Then, the estimation target metadata pieces are replaced by the cluster IDs, which produces a new estimation case-data set.

In S1304, the estimation process is performed using the estimation case-data set obtained in S1303. This estimation process corresponds to the process described with reference to the aforementioned flow chart in FIG. 8. After the estimation process, the process proceeds to S1305.

In S1305, the results obtained in S1304 are stored. Then, data pieces at the next level in hierarchies are listed. Thereafter, the process returns to S1302. Specifically, child cluster IDs whose parent cluster IDs are equivalent to the resultant cluster IDs are listed from the hierarchical structure table in FIG. 19. For example, if "1701" is obtained as a result, "1702" is listed. Note that, if no data piece is found at the next level in hierarchies, it means that the list is empty.

Meanwhile, in S1306, process results are configured. Specifically, since the results stored in S1305 are the cluster IDs, they are replaced by their corresponding metadata values. To be more specific, when the stored results are "1701⇒1702 ⇒1703," the cluster table in FIG. 18 is referred to in order to obtain "A⇒B⇒C". Note that, if no results are stored in S1305, "non-estimable" is given as a result. Note that the processing from S1301 to S1306 is performed by the hierarchical estimation unit 307 in the above description of the present embodiment.

In the above description of the present embodiment, image data obtained by the assignment target acquisition unit 302 and metadata related to the image data are used as estimation target data. In the present embodiment, a group of image data pieces or a group of metadata pieces associated with images is used as estimation target metadata pieces.

To create such groups, for example in cases where the assignment target acquisition unit 302 acquires image data pieces or only metadata pieces that are managed in folders in the external storage device 104, each folder may be organized into a group. Then, a representative value such as an average value or a mode value may be acquired from metadata pieces that constitute the group. However, the method for creating groups and the method for acquiring the values of metadata pieces are not limited thereto.

Alternatively, in cases where metadata pieces for a group is obtained from estimation, the assignment target writing unit 308 writes the metadata pieces so as to reflect this to all components in the group.

In the above-described configuration, in cases of using a set of image data pieces to which metadata pieces have been previously assigned, an estimation method is determined in correspondence with the status, which increases the accuracy in obtaining metadata pieces.

The present invention provides a technique that allows high-precision determination of appropriate metadata pieces irrespective of the properties of data pieces that have been prepared in advance for the estimation of metadata pieces.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-135356, filed on Jun. 4, 2009, which is hereby incorporated by reference herein in its entirety.

What is claimed is:

1. An information processing apparatus comprising:
a first position acquiring unit configured to acquire a position metadata piece from a target data piece, the position metadata piece indicating a position;
a second position acquiring unit configured to acquire position metadata pieces from a plurality of other data pieces different from the target data piece;
a target acquiring unit configured to acquire target metadata pieces other than the position metadata pieces from the other data pieces;
an analysis unit configured to analyze a distribution of the target metadata pieces based on positions indicated by the position metadata pieces acquired from the other data pieces;
an assignment unit configured to assign to the target data piece a target metadata piece that has a value related to the target data piece, the target metadata piece being selected from among the analyzed target metadata pieces, based on the distribution and the position indicated by the position metadata piece acquired from the target data piece;
a clustering unit configured to, for each value of the analyzed target metadata pieces, organize the position metadata pieces acquired from the other data pieces into a plurality of clusters;
a region creating unit configured to, for each of the clusters, create a region in correspondence with the cluster, in which a position indicated by each position metadata piece included in the cluster can exist;
an inclusion determination unit configured to, when the position indicated by the position metadata piece acquired from the target data piece exists in a first region as one of the regions and in a second region different from the first region, determine whether or not the first region is included in the second region;
a hierarchical information holding unit configured to hold hierarchical information indicating a combination of values that have a higher-level and lower-level hierarchical relationship from among the values of the target metadata pieces assigned to the other data pieces; and
a hierarchy confirmation unit configured to, when the position indicated by the position metadata piece acquired from the target data piece is included in a first region as one of the regions and in a second region different from the first region, confirm whether or not hierarchical information is held, in which a target metadata piece assigned to another data piece having an assigned position metadata piece included in the cluster corresponding to the first region is at a lower level in a hierarchy, and a target metadata piece assigned to another data piece having an assigned position metadata piece included in the cluster corresponding to the second region is at a higher level in the hierarchy,
wherein, when the position indicated by the position metadata piece acquired from the target data piece exists in any of the regions, the assignment unit assigns to the target data piece a target metadata piece assigned to another data piece having an assigned position metadata piece included in the cluster corresponding to the region,
wherein, if the first region is determined to be included in the second region, the assignment unit assigns to the target data piece a target metadata piece assigned to another data piece having an assigned position metadata piece included in the cluster corresponding to the first region,
wherein, if the holding of the hierarchical information is confirmed, the assignment unit assigns to the target data piece a target metadata piece assigned to another data piece having an assigned position metadata piece included in the cluster corresponding to the first region, and
wherein if the inclusion determination unit determines that the first region is included in the second region, the hierarchical information holding unit further holds hierarchical information indicating that a target metadata piece assigned to another data piece having an assigned position metadata piece included in the cluster corresponding to the first region is at a lower level in the hierarchy, and a target metadata piece assigned to another data piece having an assigned position metadata piece included in the cluster corresponding to the second region is at a higher level in the hierarchy,
wherein at least one of the first position acquiring unit, the second position acquiring unit, the target acquiring unit, the analysis unit, the assignment unit, the clustering unit, the region creating unit, the inclusion determination unit, the hierarchical information holding unit, and the hierarchy confirmation unit comprises at least one of a processor and a memory.

2. The information processing apparatus according to claim 1, further comprising:
an excluding unit configured to exclude from a cluster a position metadata piece that indicates a position located more than a predetermined distance away from a representative position that is obtained from positions indicated by a plurality of position metadata pieces included in the cluster,
wherein the region creation unit creates a region from the cluster obtained after the exclusion.

3. The information processing apparatus according to claim 2, wherein the representative position is an average position or a median position obtained from the positions.

4. An information processing apparatus comprising:
a first position acquiring unit configured to acquire a position metadata piece from a target data piece, the position metadata piece indicating a position;
a second position acquiring unit configured to acquire position metadata pieces from a plurality of other data pieces different from the target data piece;

a target acquiring unit configured to acquire target metadata pieces other than the position metadata pieces from the other data pieces;
an analysis unit configured to analyze a distribution of the target metadata pieces based on positions indicated by the position metadata pieces acquired from the other data pieces;
an assignment unit configured to assign to the target data piece a target metadata piece that has a value related to the target data piece, the target metadata piece being selected from among the analyzed target metadata pieces, based on the distribution and the position indicated by the position metadata piece acquired from the target data piece;
a clustering unit configured to, for each value of the analyzed target metadata pieces, organize the position metadata pieces acquired from the other data pieces into a plurality of clusters;
a region creating unit configured to, for each of the clusters, create a region in correspondence with the cluster, in which a position indicated by each position metadata piece included in the cluster can exist;
a hierarchical information holding unit configured to hold hierarchical information indicating a combination of values that have a higher-level and lower-level hierarchical relationship from among the values of the target metadata pieces assigned to the other data pieces; and
a hierarchy confirmation unit configured to, when the position indicated by the position metadata piece acquired from the target data piece exists in a first region as one of the regions and in a second region different from the first region, confirm whether or not hierarchical information is held, in which a target metadata piece assigned to another data piece having an assigned position metadata piece included in the cluster corresponding to the first region is at a lower level in a hierarchy, and a target metadata piece assigned to another data piece having an assigned position metadata piece included in the cluster corresponding to the second region is at a higher level in the hierarchy,
wherein, when the position indicated by the position metadata piece acquired from the target data piece exists in any of the regions, the assignment unit assigns to the target data piece a target metadata piece assigned to another data piece having an assigned position metadata piece included in the cluster corresponding to the region, and
wherein, if the holding of the hierarchical information is confirmed, the assignment unit assigns to the target data piece a target metadata piece assigned to another data piece having an assigned position metadata piece included in the cluster corresponding to the first region,
wherein at least one of the first position acquiring unit, the second position acquiring unit, the target acquiring unit, the analysis unit, the assignment unit, the clustering unit, the region creating unit, the hierarchical information holding unit, and the hierarchy confirmation unit comprises at least one of a processor and a memory.

5. An information processing method comprising:
a first position acquiring step of acquiring a position metadata piece from a target data piece, the position metadata piece indicating a position;
a second position acquiring step of acquiring position metadata pieces from a plurality of other data pieces different from the target data piece;
a target acquiring step of acquiring target metadata pieces other than the position metadata pieces from the other data pieces;
an analyzing step of analyzing a distribution of the target metadata pieces based on positions indicated by the position metadata pieces acquired from the other data pieces;
an assigning step of assigning to the target data piece a target metadata piece that has a value related to the target data piece, the target metadata piece being selected from among the analyzed target metadata pieces, based on the distribution and the position indicated by the position metadata piece acquired from the target data piece;
a clustering step of, for each value of the analyzed target metadata pieces, organizing the position metadata pieces acquired from the other data pieces into a plurality of clusters;
a region creating step of, for each of the clusters, creating a region in correspondence with the cluster, in which a position indicated by each position metadata piece included in the cluster can exist;
an inclusion determining step of, when the position indicated by the position metadata piece acquired from the target data piece exists in a first region as one of the regions and in a second region different from the first region, determining whether or not the first region is included in the second region;
a hierarchical information holding step of holding hierarchical information indicating a combination of values that have a higher-level and lower-level hierarchical relationship from among the values of the target metadata pieces assigned to the other data pieces; and
a hierarchy confirming step of, when the position indicated by the position metadata piece acquired from the target data piece is included in a first region as one of the regions and in a second region different from the first region, confirming whether or not hierarchical information is held, in which a target metadata piece assigned to another data piece having an assigned position metadata piece included in the cluster corresponding to the first region is at a lower level in a hierarchy, and a target metadata piece assigned to another data piece having an assigned position metadata piece included in the cluster corresponding to the second region is at a higher level in the hierarchy,
wherein, when the position indicated by the position metadata piece acquired from the target data piece exists in any of the regions, the assigning step assigns to the target data piece a target metadata piece assigned to another data piece having an assigned position metadata piece included in the cluster corresponding to the region,
wherein, if the first region is determined to be included in the second region, the assigning step assigns to the target data piece a target metadata piece assigned to another data piece having an assigned position metadata piece included in the cluster corresponding to the first region,
wherein, if the holding of the hierarchical information is confirmed, the assigning step assigns to the target data piece a target metadata piece assigned to another data piece having an assigned position metadata piece included in the cluster corresponding to the first region, and
wherein if the inclusion determining step determines that the first region is included in the second region, the hierarchical information holding step further holds hierarchical information indicating that a target metadata piece assigned to another data piece having an assigned position metadata piece included in the cluster corresponding to the first region is at a lower level in the hierarchy, and a target metadata piece assigned to another data piece having an assigned position metadata piece included in the cluster corresponding to the second region is at a higher level in the hierarchy.

6. A computer-readable storage medium that stores a program to cause a computer to execute an information processing method, the method comprising:

a first position acquiring step of acquiring a position metadata piece from a target data piece, the position metadata piece indicating a position;

a second position acquiring step of acquiring position metadata pieces from a plurality of other data pieces different from the target data piece;

a target acquiring step of acquiring target metadata pieces other than the position metadata pieces from the other data pieces;

an analyzing step of analyzing a distribution of the target metadata pieces based on positions indicated by the position metadata pieces acquired from the other data pieces;

an assigning step of assigning to the target data piece a target metadata piece that has a value related to the target data piece, the target metadata piece being selected from among the analyzed target metadata pieces, based on the distribution and the position indicated by the position metadata piece acquired from the target data piece;

a clustering step of, for each value of the analyzed target metadata pieces, organizing the position metadata pieces acquired from the other data pieces into a plurality of clusters;

a region creating step of, for each of the clusters, creating a region in correspondence with the cluster, in which a position indicated by each position metadata piece included in the cluster can exist;

an inclusion determining step of, when the position indicated by the position metadata piece acquired from the target data piece exists in a first region as one of the regions and in a second region different from the first region, determining whether or not the first region is included in the second region;

a hierarchical information holding step of holding hierarchical information indicating a combination of values that have a higher-level and lower-level hierarchical relationship from among the values of the target metadata pieces assigned to the other data pieces; and a hierarchy confirming step of, when the position indicated by the position metadata piece acquired from the target data piece is included in a first region as one of the regions and in a second region different from the first region, confirming whether or not hierarchical information is held, in which a target metadata piece assigned to another data piece having an assigned position metadata piece included in the cluster corresponding to the first region is at a lower level in a hierarchy, and a target metadata piece assigned to another data piece having an assigned position metadata piece included in the cluster corresponding to the second region is at a higher level in the hierarchy, wherein, when the position indicated by the position metadata piece acquired from the target data piece exists in any of the regions, the assigning step assigns to the target data piece a target metadata piece assigned to another data piece having an assigned position metadata piece included in the cluster corresponding to the region, wherein, if the first region is determined to be included in the second region, the assigning step assigns to the target data piece a target metadata piece assigned to another data piece having an assigned position metadata piece included in the cluster corresponding to the first region, wherein, if the holding of the hierarchical information is confirmed, the assigning step assigns to the target data piece a target metadata piece assigned to another data piece having an assigned position metadata piece included in the cluster corresponding to the first region, and wherein if the inclusion determining step determines that the first region is included in the second region, the hierarchical information holding step further holds hierarchical information indicating that a target metadata piece assigned to another data piece having an assigned position metadata piece included in the cluster corresponding to the first region is at a lower level in the hierarchy, and a target metadata piece assigned to another data piece having an assigned position metadata piece included in the cluster corresponding to the second region is at a higher level in the hierarchy.

7. An information processing method comprising:

a first position acquiring step of acquiring a position metadata piece from a target data piece, the position metadata piece indicating a position;

a second position acquiring step of acquiring position metadata pieces from a plurality of other data pieces different from the target data piece;

a target acquiring step of acquiring target metadata pieces other than the position metadata pieces from the other data pieces;

an analyzing step of analyzing a distribution of the target metadata pieces based on positions indicated by the position metadata pieces acquired from the other data pieces;

an assigning step of assigning to the target data piece a target metadata piece that has a value related to the target data piece, the target metadata piece being selected from among the analyzed target metadata pieces, based on the distribution and the position indicated by the position metadata piece acquired from the target data piece;

a clustering step of, for each value of the analyzed target metadata pieces, organizing the position metadata pieces acquired from the other data pieces into a plurality of clusters;

a region creating step of, for each of the clusters, creating a region in correspondence with the cluster, in which a position indicated by each position metadata piece included in the cluster can exist;

a hierarchical information holding step of holding hierarchical information indicating a combination of values that have a higher-level and lower-level hierarchical relationship from among the values of the target metadata pieces assigned to the other data pieces; and a hierarchy confirming step of, when the position indicated by the position metadata piece acquired from the target data piece exists in a first region as one of the regions and in a second region different from the first region, confirming whether or not hierarchical information is held, in which a target metadata piece assigned to another data piece having an assigned position metadata piece included in the cluster corresponding to the first region is at a lower level in a hierarchy, and a target metadata piece assigned to another data piece having an assigned position metadata piece included in the cluster corresponding to the second region is at a higher level in the hierarchy, wherein, when the position indicated by the position metadata piece acquired from the target data piece exists in any of the regions, the assigning step assigns to the target data piece a target metadata piece assigned to another data piece having an assigned position metadata piece included in the cluster corresponding to the region, and wherein, if the holding of the hierarchical information is confirmed, the assigning step assigns to the target data piece a target metadata piece assigned to another data piece having an assigned position metadata piece included in the cluster corresponding to the first region.

* * * * *